United States Patent [19]

Fisher et al.

[11] Patent Number: 5,165,804
[45] Date of Patent: Nov. 24, 1992

[54] ROLLING ELEMENT BEARING HAVING WEAR RESISTANT RACE LAND REGIONS

[75] Inventors: Kenneth L. Fisher, Lockland; Russell R. Carter, Cincinnati; Michael G. Johnson, Fairfield; Jerry D. Schell, Cincinnati; Alexander H. Nahm, Madeira; Michael J. Price, Cincinnati, all of Ohio

[73] Assignee: General Electric Company, Cincinnati, Ohio

[21] Appl. No.: 753,767

[22] Filed: Sep. 3, 1991

[51] Int. Cl.⁵ .................. F16C 33/62; F16C 33/46; F16C 33/38
[52] U.S. Cl. .................. 384/492; 384/523; 384/569; 384/572
[58] Field of Search .......... 384/470, 492, 516, 523, 384/564, 569, 572, 621, 625

[56] References Cited

U.S. PATENT DOCUMENTS

| | | | |
|---|---|---|---|
| 2,845,311 | 7/1958 | Cobb | 384/569 |
| 3,097,897 | 7/1963 | Taylor . | |
| 3,212,834 | 10/1965 | Mayer et al. . | |
| 4,204,886 | 5/1980 | Bens | 148/15.5 |
| 4,522,453 | 6/1985 | Lammer et al. | 308/3 R |
| 4,601,592 | 7/1986 | Jatczak et al. | 384/564 |
| 4,659,241 | 4/1987 | Bamberger et al. | 384/625 |
| 4,744,679 | 5/1988 | Verburg et al. | 384/523 |

FOREIGN PATENT DOCUMENTS 174718A 10/1983 Japan .

OTHER PUBLICATIONS

"Super Carburizing", Heat Treating Magazine, vol. 18, No. 10, Oct. 1986, Kern.

*Primary Examiner*—Thomas R. Hannon
*Attorney, Agent, or Firm*—Jerome C. Squillaro; Carmen Santa Maria

[57] ABSTRACT

An improved type of rolling element bearing, in which race land regions are protected against wear or scoring, is described. In particular, it is shown that a coating of a hard, wear-resistant material such as titanium nitride, applied to the race land region of a rolling element bearing, is effective in preventing wear or scoring of the race land region.

7 Claims, 1 Drawing Sheet

ROLLING ELEMENT BEARING HAVING WEAR RESISTANT RACE LAND REGIONS

BACKGROUND OF THE INVENTION

The invention pertains to rolling element bearings, and, in particular, to such bearings which are used at high speeds and heavy loads.

That rolling element bearings are effective in reducing the friction between a rotating shaft and a fixed journal, or between a rotating wheel and a fixed axle, is amply demonstrated by the widespread usage of such bearings in an enormous variety of applications. Such bearings are sometimes identified as antifriction bearings because there is generally far less friction associated with the rolling action between the rolling elements and the inner and outer races than with the sliding action between a shaft and journal in a journal bearing.

Rolling element bearings vary in size, rotational speed, operating load and temperature, and type of rolling element. The most widely used types of rolling elements in such bearings are balls, cylindrical rollers and frustoconical tapered rollers.

Many factors combine to determine the limiting speeds of bearings. To provide a check on bearing speed limits, size and rotational speed are conveniently combined in a quantity called "DN", which is the product of inside (or bore) diameter of the inner race (in millimeters) times the rotational speed (in revolutions per minute). It has been observed that bearings having a DN value above about 1,500,000 seem vulnerable to problems such as sliding or skidding of rolling elements, overheating, rolling contact fatigue, and race fracture due to high hoop stresses. Thus, a DN value over about 1,500,000 arbitrarily, but effectively, defines a high speed bearing.

Numerous means to reduce wear in rolling element bearings have been devised. For example, rolling elements and both races are frequently made of hardened steel. The steels normally used contain high levels of carbon, generally above about 0.5 percent, or the surfaces of the components of such bearings are carburized to similar carbon levels. Takei et al. (Japanese Unexamined Patent No. JP 58-174718A) have disclosed the application of hard coatings to rolling elements and both races as a means for reducing wear. However, it has been discovered that hard coatings on the rolling elements or the races may be detrimental to the operation of heavily loaded high speed bearings. Under such conditions, the hard coatings may crack or spall off, producing loose particles of the hard material. Those loose particles act as contaminant particles, as discussed below.

Rolling element bearings typically include a spacer means, usually called a cage, separator or retainer, which serves to space the rolling elements from each other uniformly around the periphery of the races. For some bearings designed to operate at high values of DN, the cage is guided by having it operate in close proximity to land or shoulder regions on either the inner race or the outer race. There is a close radial clearance, on the order of 0.010 inch, between the cage and the land regions of the guiding race. This design keeps the cage more nearly coaxial with the bearing, which improves the uniformity of spacing of the rolling elements, and also reduces vibration or wobbling of the cage.

However, a disadvantage of this design is that hard contaminant particles may become trapped in the clearance region between the cage and land region of the guiding race; if so, the contaminant particles may cause added wear of the bearing components. The problem is particularly severe when the cage is made of a relatively soft material such as bronze or when it is coated by a soft anti-seize coating such as silver. The contaminant particles may become embedded in this soft material. Such embedded contaminant particles act to cut into the land region of the guiding race. Further, debris particles produced in the wear process behave to contribute to the wear process. In spite of the considerable care normally exercised to prevent contamination of a bearing, either during manufacture, assembly or operation, such contamination remains a problem to the designer and user of rolling element bearings.

Bearings having races made of steel having very fine carbide particles in its microstructure, such as bearing races made by powder metallurgy techniques, are especially vulnerable to the problem of accelerated wear from contamination and debris because the individual carbide particles are too small to prevent contaminant and debris particles from lifting the carbide particles and supporting matrix from the surface of the metal.

Rotating compressor and turbine components of aircraft gas turbine engines are typically supported in rolling element bearings. Such bearings are routinely subjected to high speeds, high temperatures and high operating loads, yet they must be kept as light as possible to minimize overall engine weight. DN values of about 2,000,000 are typical. Engine operating temperatures dictate the use of tool steels such as M50 in place of widely used bearing steels such as AISI 52100. The bearings in an aircraft gas turbine engine must carry the entire thrust generated by the engine, plus loads resulting from the weight of the rotating components plus loads generated by in-flight maneuvers, air turbulence and landings. Such high speed, highly loaded bearings are critical to operation of the engine. Thus, such bearings must be designed and manufactured to minimize the likelihood of bearing failure.

SUMMARY OF THE INVENTION

In accordance with the present invention, an improved type of rolling element bearing is achieved by protecting race land regions against wear or scoring, especially in gas turbine engines. In particular, a coating of hard, wear-resistant material such as titanium nitride, applied to the race land region of a rolling element bearing, is effective in reducing wear or scoring of the race land region. Further, such a coating is especially effective in the type of bearing where the cage is guided and maintained in a location that is substantially coaxial with the bearing races by a close running clearance between the cage and either the inner race or the outer race.

During the development of the present invention, it was found that bearings of the type described above are vulnerable to wear or scoring due to the action of hard contaminant particles present in the small clearance space between the cage and the guiding race land region. While it is obviously desirable to exclude hard contaminant particles from rolling element bearings, one skilled in the art will recognize that in practice it may be nearly impossible to maintain sufficient freedom from contaminant particles so as to preclude the wear or scoring described above. Thus, it is an object of the present invention to provide a rolling element bearing that has a reduced vulnerability to such wear or scoring.

Another feature of the present invention includes a rolling element bearing having race land regions protected against wear or scoring. A rolling element bearing having reduced vulnerability to such wear or scoring, but otherwise functioning in a manner substantially identical to similar bearings not including such protection is provided.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Pursuant to the present invention, an improved rolling element bearing having reduced vulnerability to wear and scoring due to foreign particles in the clearance space between the cage and guiding race land region is provided. The improvement includes application of a hard, wear-resistant material to the race land region of the bearing. The applied material is physically compatible with the race land region material in that it is relatively easy to apply, and remains attached to the race land region despite the harsh operating conditions encountered in this region of the bearing. Foreign particles include, but are not limited to, contaminants inadvertently introduced into the bearing, debris resulting from bearing wear, other debris resulting from wear processes outside the bearing, and the like.

Figure 1:
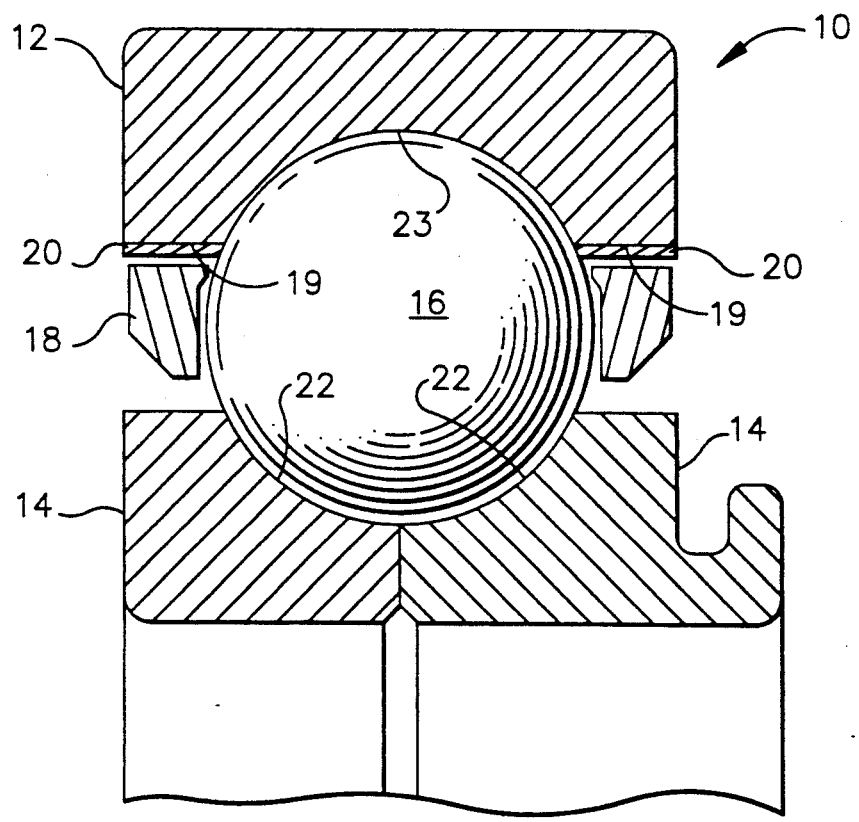
FIG. 1 is a schematic cross section of a rolling element bearing having a cage which is guided by a close running clearance between the cage and the outer race land regions.
Figure 2:
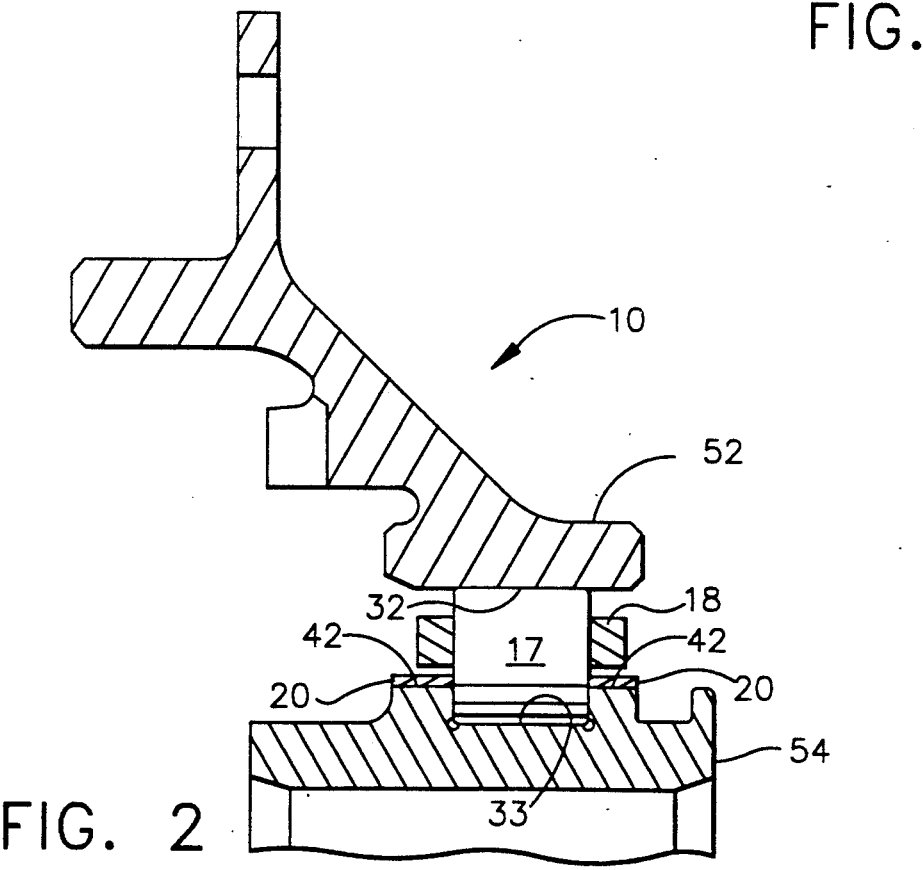
FIG. 2 is a schematic cross section of a rolling element bearing having a cage which is guided by a close running clearance between the cage and the inner race land regions.

FIGS. 1 and 2 are schematic cross sections of rolling element bearings. In FIG. 1 the rolling elements 16 are shown as balls which operate between rolling contact surfaces 22 and 23; in FIG. 2 the rolling elements 17 are shown as rollers which operate between rolling contact surfaces 32 and 33. Also, in FIG. 1 the guiding race land region 19 is on an outer race 12, and in FIG. 2, the guiding race land region 42 is on an inner race 54. The drawings are illustrative, rather than limiting, for the present invention is applicable to the general class of rolling element bearings, regardless of whether the rolling elements are balls, rollers, tapered rollers, or some other type of rolling element, or whether the cage is guided by land regions on the inner or the outer race.

As shown in FIG. 1, a rolling element bearing 10 is comprised of an outer race 12, an inner race 14, a plurality of rolling elements 16 which are positioned by a cage 18. As indicated previously, one of the principal functions of the cage is to maintain the rolling elements in positions that are substantially equally spaced in the operating space between the races. This function is better achieved by guiding the cage on each side of the rolling elements by a close operating clearance between the cage and the race land regions 19 of the guiding race. The previously described problem of wear of the bearing components is frequently apparent on the race land regions.

In the present invention, such wear of the race land regions has been substantially reduced by the use of a hard, thin coating 20 applied to the race land regions 19 of the guiding race, but not to the rolling contact surfaces 22 and 23 of the races. The restriction that the coating be applied to the race land regions, but not to the contact surfaces, is an important feature of the present invention. As indicated previously, the hard coatings on the rolling elements and rolling contact surfaces disclosed by Takei et al. are vulnerable to spalling or flaking off under heavy loading, thereby producing contaminant particles which can cause wear or scoring in the wear land regions. Surprisingly, it was found that hard coatings, when employed in accordance with the present invention, provide protection against wear in the wear land regions without the risk of spalling or flaking off under heavy loading. Thus, within the scope of the present invention, the application of the hard coating is intentionally applied to the race land regions 19, and specifically avoided on the rolling elements 16 or 17 and rolling contact surfaces 22 and 23. Whether the application of the hard coating to other regions of the races should be permitted would depend on other functional and manufacturing considerations of the bearing.

There is considerable latitude in the material selected for hard coating, and in the method for applying that coating. Within the context of the present invention the term hard coating is taken to include both coatings overlaid on the surface of the substrate and surface treatments which alter the characteristics of the surface of the substrate, unless otherwise specified. Although structurally distinct, the two classes of coating are functionally similar. Overlay coatings, such as titanium nitride, are applied to the surface of the race land regions with minimal change in the composition of the bearing race material. Surface treatments, such as nitriding or carburizing, represent the addition of one or more elemental species to the surface region of the bearing race material, thereby effecting a localized change in its composition, typically accompanied by a localized change in microstructure. A distinction is made between two types of carburizing treatments which may be performed on the races. Saturation carburizing adds carbon in excess of its solubility in austenite at the carburizing temperature, specifically to develop massive wear-resistant carbides, and is considered a surface treatment. Conventional carburizing adds lesser percentages of carbon, albeit to greater depths, and is considered part of manufacturing the races prior to application of either type of coating.

Numerous types of coatings, including titanium nitride, titanium carbide, titanium carbonitride, zirconium nitride, tungsten carbide, thin dense chromium and a combination of thin dense chromium coated with tungsten sulfide lubricant film, are applicable to the present invention. Suitable methods for applying the coatings include physical vapor deposition, electroplating and ion implantation, all of which are known in the art. The combination of titanium nitride applied by physical vapor deposition, or a variant thereof, has been found to be particularly effective. Those skilled in the art will recognize that there are other types of hard coating and other methods of application which will produce hard coatings having functional equivalence to, and included within the scope of, the coatings contemplated in the present invention.

EXAMPLE 1

A bearing of the type shown schematically in FIG. 1 was being operating at a DN value of about 2,000,000 in a gas turbine engine. It was found to be vulnerable to hard particle contamination, which produced wear and scoring in the outer race land regions. Applying a coating of titanium nitride about 2 to 5 micrometers thick by physical vapor deposition substantially eliminated the problem, both in laboratory tests and factory engine tests.

EXAMPLE 2

A bearing having an integral hard coating is prepared by saturation carburizing. A bearing race having race land regions for guiding a cage is made from a low carbon bearing steel of the type described by Bamberger et al. (U.S. Pat. No. 4,659,241), allowing approximately 0.020 inch excess stock in the rolling contact region. The race is then carburized to a depth of about 0.045 inch and a surface carbon content of about 0.90 percent carbon; the race is further carburized to a depth of about 0.015 inch and a surface carbon content of at least about 1.2 percent carbon. The race is then heat treated to spheroidize the carbide particles, and thus avoid a grain boundary carbide network in the finished part. Then it is machined to near nominal dimensions in the rolling contact region, effectively removing the integral hard coating in that region. Next, it is further heat treated to optimize retained austenite in the structure and achieve the desired hardness in the rolling contact region and race land regions. Then it is finish ground to the required dimensions. Alternatively, a mask to carburizing, such as a layer of electroplated nickel in selected regions, is applied after the first carburizing step to limit the extent of the second carburized layer to predetermined regions of the part.

In light of the foregoing discussion, it will be apparent to those skilled in the art that the present invention is not limited to the embodiments, methods and compositions herein described. Numerous modifications, changes, substitutions and equivalents will not become apparent to those skilled in the art, all of which fall within the scope contemplated by the invention.

The invention having been thus described, what is claimed as new and desired to be secured by Letters Patent is:

1. A rolling element bearing comprising:
    an outer race of generally annular configuration having an inner surface comprised of a rolling contact region disposed between two land regions, each land region having a hard coating of substantially uniform thickness affixed thereto;
    an inner race of generally annular configuration having an outer surface comprising a rolling contact region, the inner race being disposed concentrically within the outer race, thereby defining an annular space between the inner race and the outer race;
    a plurality of rolling elements of substantially uniform size, each of the elements being disposed in the annular space and contacting the outer race and the inner race;
    spacer means for positioning the rolling elements in substantially equal angular intervals around the periphery of the annular space, the spacer means having an outer surface comprising two land regions, each of which is proximately located in opposition to, and acts in cooperation with, one of the land regions of the outer race;
    wherein the presence of the hard coating affixed to the land regions of the outer race is avoided on the rolling contact regions of the races and the rolling elements; and
    wherein the proximity between the respective land regions of the spacer means and the land regions of the outer race constrains the spacer means to a substantially concentric position within the outer race without restricting rotational motion therebetween.

2. A bearing comprising:
    an outer race of generally annular configuration having an inner surface comprised of a rolling contact region;
    an inner race of generally annular configuration having an outer surface comprising a rolling contact region disposed between two land regions, each land region having a hard coating of substantially uniform thickness affixed thereto, the inner race being disposed concentrically within the outer race, thereby defining an annular space between the inner race and the outer race;
    a plurality of rolling elements of substantially uniform size, each of the elements being disposed in the annular space and contacting the outer race and the inner race;
    spacer means for positioning the rolling elements in substantially equal angular intervals around the periphery of the annular space, the spacer means having an inner surface comprising two land regions, each of which is proximately located in opposition to, and acts in cooperation with, one of the land regions of the inner race;
    wherein the presence of the hard coating affixed to the land regions of the inner race is avoided on the rolling contact regions of the races and the rolling elements; and
    wherein the proximity between the respective land regions of the spacer means and the land regions of the inner race constrains the spacer means to a substantially concentric position around the inner race without restricting rotational motion therebetween.

3. The bearing claimed in claim 1 or claim 2, wherein the hard coating is an overlay coating having a thickness of about 0.1 to about 25 micrometers.

4. The bearing claimed in claim I or claim 2, wherein the hard coating is an overlay coating comprised of a material selected from the group consisting of: titanium nitride, titanium carbide, titanium carbonitride, zirconium nitride, tungsten carbide, thin dense chromium and thin dense chromium with a tungsten disulfide solid lubricant film.

5. The bearing claimed in claim 1 or claim 2, wherein the hard coating is an overlay coating comprised of titanium nitride.

6. The bearing claimed in claim I or claim 2, wherein the hard coating is an integral coating produced by a treatment selected from the group consisting of nitriding, nitrocarburizing and saturation carburizing.

7. The bearing claimed in claim 1 or claim 2, wherein the hard coating is an integral coating having a thickness of about 20 to about 1000 micrometers.

* * * * *